United States Patent [19]

Dalferth

[11] Patent Number: 4,944,388
[45] Date of Patent: Jul. 31, 1990

[54] CHAIN CONVEYOR

[75] Inventor: Hans Dalferth, Aalen-Wasseralfingen, Fed. Rep. of Germany

[73] Assignees: RUD-Kettenfabrik Rieger; Dietz GmbH u. Co., both of Aalen, Fed. Rep. of Germany

[21] Appl. No.: 321,913

[22] Filed: Mar. 10, 1989

[30] Foreign Application Priority Data

Mar. 14, 1988 [DE] Fed. Rep. of Germany ....... 3808827

[51] Int. Cl.$^5$ .............................................. B65G 19/24
[52] U.S. Cl. ................................................. 198/731
[58] Field of Search ................ 198/731, 728, 730, 733

[56] References Cited

U.S. PATENT DOCUMENTS

| 4,113,084 | 9/1978 | Temme | 198/731 |
| 4,316,537 | 2/1982 | Rieger et al. | 198/731 |
| 4,320,827 | 3/1982 | Puppel et al. | 198/731 |

FOREIGN PATENT DOCUMENTS

| 231892 | 6/1963 | Austria . | |
| 935116 | 10/1973 | Canada | 198/731 |
| S28514 | 5/1956 | Fed. Rep. of Germany | 198/731 |
| 1853977 | 9/1962 | Fed. Rep. of Germany . | |
| 1781178 | 1/1971 | Fed. Rep. of Germany . | |
| 2925045 | 1/1981 | Fed. Rep. of Germany . | |
| 1057487 | 2/1967 | United Kingdom | 198/731 |
| 2138764 | 10/1984 | United Kingdom | 198/731 |

*Primary Examiner*—Robert J. Spar
*Assistant Examiner*—Cheryl L. Gastineau
*Attorney, Agent, or Firm*—Mark P. Stone

[57] ABSTRACT

In a chain conveyor, the conveying elements (4) are connected via coupling elements (8, 9) to connecting chain links (1, 2) of at least one drive chain strand. The coupling elements (8, 9) are swung from different sides into the clear inner spaces (7) of the connecting chain links (1, 2). By the type of connection between the coupling elements (8, 9) and the connecting chain links (1, 2), a stable arrangement of the conveying elements (4) is obtained, in which arrangement special securing elements which prevent the coupling elements (8, 9) from being undesirably released from the connecting chain links (1, 2) can be dispensed with.

11 Claims, 2 Drawing Sheets

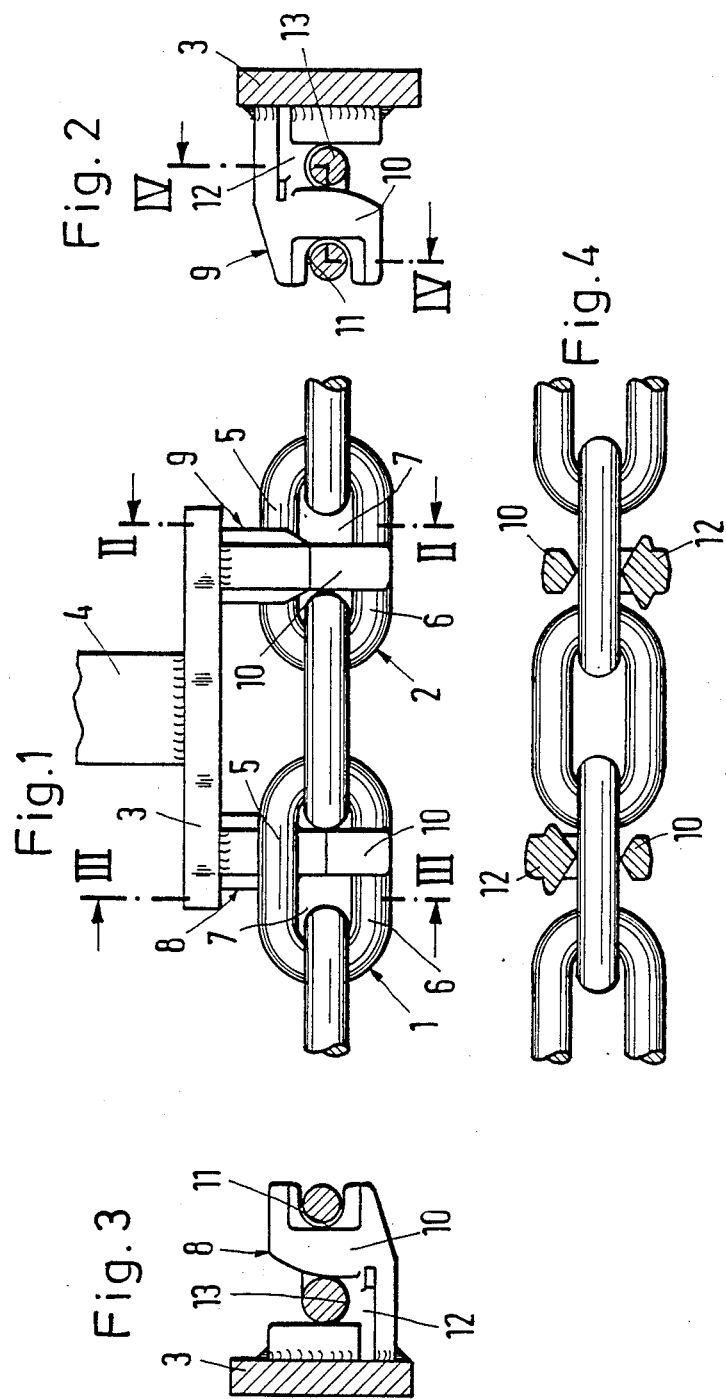

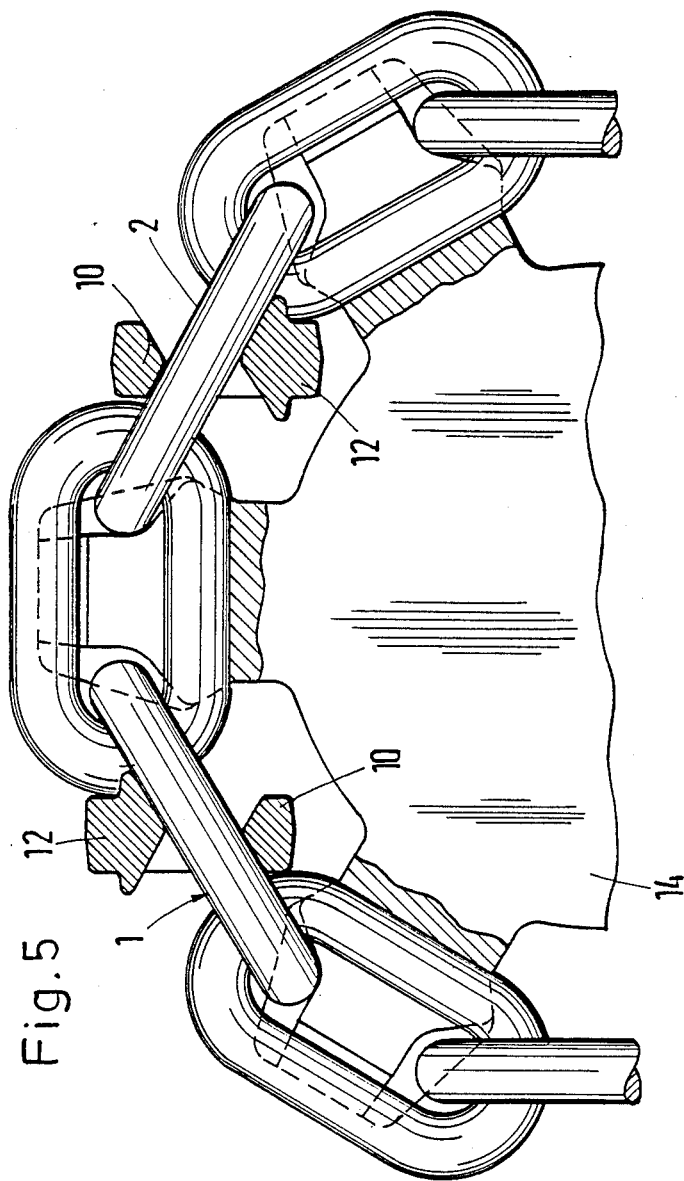

CHAIN CONVEYOR

BACKGROUND OF THE INVENTION

The invention relates to a chain conveyor comprising at least one drive chain strand, having oval round-steel links, for conveying elements, in particular scrapers, which are connected to the drive chain strand via coupling elements which are fixed to retaining plates of the conveying elements and engage into the clear inner spaces of a pair of connecting chain links which directly follow one another and have the same orientation.

German Patent Specification 2,925,045 (corresponding to U.S. Pat. No. 4,316,537) discloses a chain conveyor of the type considered in which the coupling elements are formed by pin-like projections which are provided with guide hollows for the nose of one chain link each, surrounded by the guide hollows and orientated at right angles to the respective retaining plate. Since in the known chain conveyor, for the drive of which only toothed chain wheels, but not pocket chain wheels, are suitable, the guide hollows largely enclose the noses of the links, large forces can be transmitted from the drive chain strand to the conveying elements during both forward and reverse motion of the chain conveyor. The known construction is therefore primarily used when difficult operating conditions have to be met.

SUMMARY OF THE INVENTION

Against this background, the object of the invention is to create a chain conveyor, provided with pocket chain wheels, for light to medium applications, in which chain conveyor it is not so much the size of the forces which can be transmitted without problem that is important, but rather ease of assembly and reliable, in particular stable, guidance of the conveying elements. This object is achieved according to the invention when the connecting chain links are arranged in planes orientated at right angles to the retaining plates, when the coupling elements, in planes orientated at right angles to the longitudinal legs of the connecting chain links, are swung in opposite directions into the clear inner spaces of the connecting chain links of each pair of connecting chain links, and when one longitudinal leg of each connecting chain link is guided in a guide hollow of the coupling element, while the other longitudinal leg bears against a stop which is likewise formed by the coupling element and limits the swing-in travel of the coupling element.

BRIEF DESCRIPTION OF THE DRAWINGS

Further details and features of the invention follow from the sub-claims and the following description of an exemplary embodiment shown in the attached drawing, in which:

FIG. 1 shows a plan view of a part of a conveying element connected to a chain strand section, FIG. 2 shows a section along line II—II in FIG. 1, FIG. 3 shows a section along line III—III in FIG. 1, FIG. 4 shows a section along line IV—IV in FIG. 2, FIG. 5 shows the position of the parts shown in FIG. 4 when passing a pocket chain wheel.

DESCRIPTION OF THE BEST MODES FOR CARRYING OUT THE INVENTION

Figure 6:
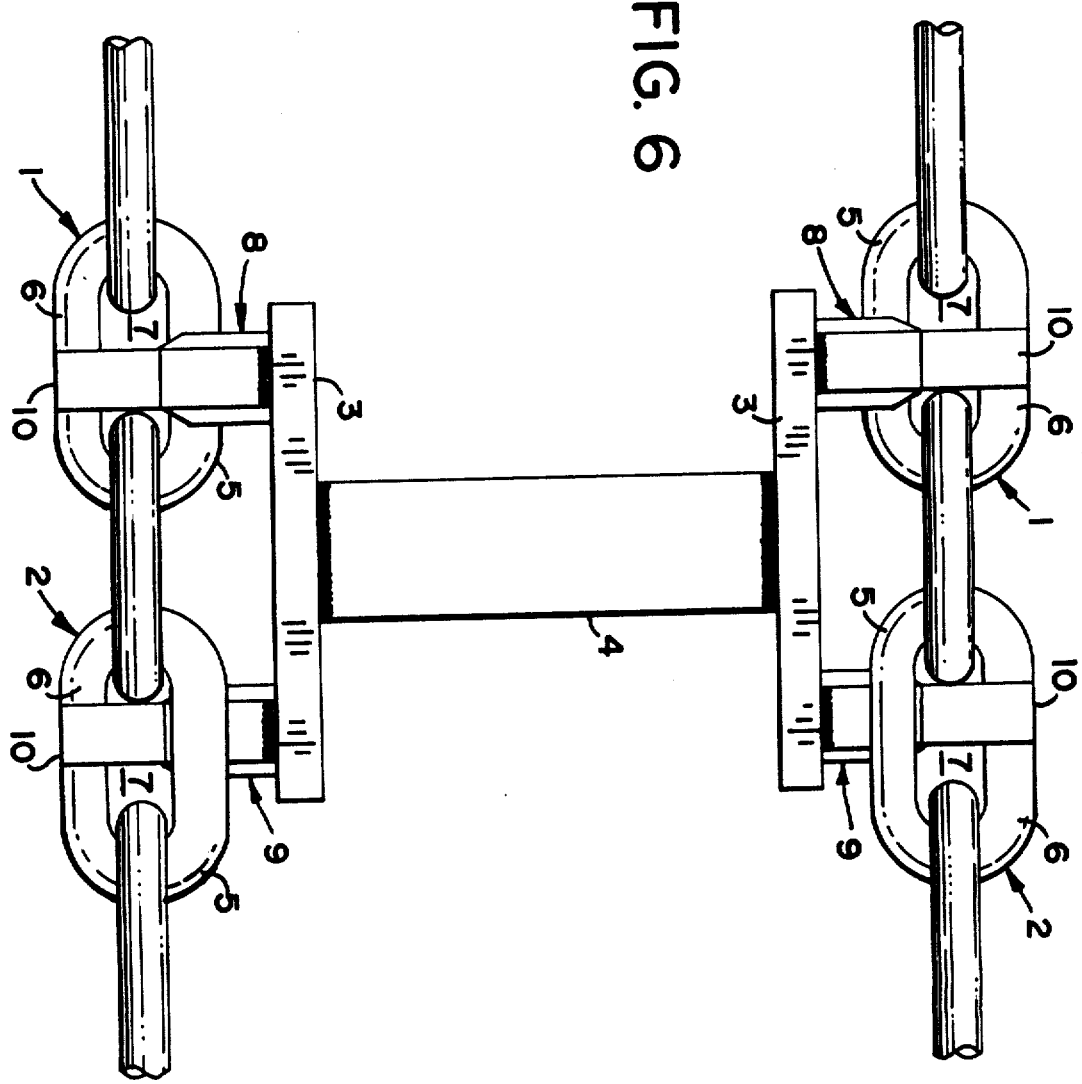
FIG. 6 shows a plan view similar to that of FIG. 1, illustrating an embodiment of the invention having two drive chain strands with a conveying element arranged between them.

In the figures, 1 and 2 are connecting chain links of the drive chain strand of a chain conveyor, which connecting chain links are orientated at right angles to a retaining plate 3 for conveying elements 4 designed as scrapers. Identically shaped coupling elements 8 and 9 of simple design, connected to the retaining plate 3 by welding, engage into the clear inner spaces 7 of the connecting chain links 1, 2, from the same side which inner spaces 7 are defined laterally by longitudinal legs 5 and 6. The coupling elements 8 and 9 each have a U-shaped head part 10 having a guide hollow 11 for the longitudinal leg 6 of a connecting chain link 1 or 2 remote from the retaining plate 3. The head part 10 is connected to the retaining plate 3 via a web part 12. The web part 12 is provided with a guide hollow 13 for the longitudinal leg 5 of the connecting chain links 1,2 which faces the retaining plate 3. The guide hollow 13 forms a stop which limits the swinging movement of the coupling elements 8 and 9, inserted in different directions, i.e. from the bottom or top, into the connecting chain links 1,2.

As FIGS. 4 and 5 show, the parts of the guide hollows 11,13 facing the upper and lower sides of the longitudinal legs 5,6 of the connecting chain links 1,2 are designed in a roof shape. The roof-shaped design ensures unimpeded running of the connecting chain links 1,2 over the pocket chain wheel 14 shown in FIG. 5. As also seen in FIG. 5, the connecting chain links 1,2 are oriented in planes parallel to the axis of rotation of the pocket chain wheel passed by the connecting chain links.

FIG. 6 of the drawing illustrates a further embodiment of the invention in which one or more conveying elements 4 are arranged between two drive chain strands of a chain conveyor. The structure and operation of the embodiment of the invention illustrated by FIG. 6 corresponds to that of the embodiment of the invention illustrated by FIGS. 1–5. The same reference numerals have been used in FIG. 6 to designate corresponding elements illustrated in FIGS. 1–5.

The figures show that the coupling elements 8 and 9, in each case welded to a retaining plate 3 and arranged in opposite directions, are of very simple design and that securing parts for maintaining the connection between the coupling elements 8,9 and the connecting chain links 1 and 2 are unnecessary.

I claim:

1. Chain conveyor comprising at least one drive chain strand, passng over chain wheels (14) and having oval round-steel links for conveying elements (4), which are connected to the drive chain strand via coupling elements (8,9) which are fixed to retaining plates (3) of the conveying elements (4) and pairs of which engage from a same side into the clear inner spaces (7) of a pair of connecting chain links (1,2) which directly follow one another and have the same orientation, each of said connecting chain links having two longitudinal legs (5,6), the coupling elements of each pair of coupling elements (8,9) being arranged in opposite directions into the clear inner spaces (7) of the connecting chain links (1,2) of each pair of connecting chain links in planes oriented at right angles to the longitudinal legs (5,6) of said connecting chain links (1,2), characterized in that one longitudinal leg (6) of each connecting chain link (1,2) is guided in a guide hollow (11) of each coupling element (8,9) and the other longitudinal leg (5) bears against a stop which is likewise formed by each coupling element (8,9) and limits movement of each coupling element (8,9) into said connecting chain link engaged by said coupling element.

2. Chain conveyor according to claim 1, characterized in that the stops limiting the movement are also designed as guide hollows (13).

3. Chain conveyor according to claim 2, characterized in that the parts of the guide hollows (11,13) facing the upper and lower sides of the longitudinal legs (5,6) of the connecting chain links (1,2) are designed in a roof shape.

4. Chain conveyor according to claim 1, characterized in that the coupling elements (8,9) have an essentially U-shaped head part (10) having said guide hollow (11) for guiding the longitudinal leg (6) of said connecting chain links (1,2) remote from the retaining plate (3).

5. Chain conveyor according to claim 4, characterized in that adjoining the head part (10) is a web part (12) which is provided with a second guide hollow (13) for the longitudinal leg (5) of the connecting chain links (1,2) facing the retaining plate (3).

6. Chain conveyor according to claim 1, characterized in that all the coupling elements (8, 9) have the same shape and are connected to the retaining plates (3) by welding.

7. Chain conveyor according to claim 1, characterized in that said chain conveyor has two drive chain strands with conveying elements (4) arranged between them.

8. Chain conveyor according to claim 1 in which said conveying elements (4) are scrapers.

9. Chain conveyor according to claim 1 characterized in that the parts of said guide hollow (11) for guiding said one longitudinal leg of said connecting chain links (1,2) are designed in a roof shape.

10. Chain conveyor according to claim 1 wherein said connecting chain links (1,2) are oriented in planes parallel to the axis of rotation of said chain wheels (14) over which said connecting chain links pass.

11. The chain conveyor as claimed in claim 1 wherein said longitudina leg (6) of each connecting chain link (1,2) remote from the retaining plate (3) is guided in said first guidee hollow (11) formed by an essentially U-shaped head part (10) of each coupling element (8,9), and the longitudinal leg (5) of each connecting chain link (1,2) facing said retaining plate (3) is guided in a second guide hollow (13) formed by a web part (12) adjoining said head part (10).

* * * * *

UNITED STATES PATENT AND TRADEMARK OFFICE
CERTIFICATE OF CORRECTION

PATENT NO. : 4,944,388

DATED : July 31, 1990

INVENTOR(S) : Hans Dalferth

It is certified that error appears in the above-identified patent and that said Letters Patent is hereby corrected as shown below:

1). Cover Sheet, item (73): Delete item (73) in its entirety and substitute:
- -Assignee: RUD-Kettenfabrik Rieger & Dietz GmbH u. Co., of Aalen, Fed. Rep. of Germany- -.

2). Column 4, Line 18: Delete "longitudina", and substitute - -longitudinal- -.

3). Column 4, Line 20: Delete "guidee", and substitute - -guide- -.

4). Add Figure 6 (attached hereto) to the drawing.

Signed and Sealed this

Twenty-fifth Day of February, 1992

Attest:

HARRY F. MANBECK, JR.

Attesting Officer     Commissioner of Patents and Trademarks